United States Patent Office 3,494,588
Patented Feb. 10, 1970

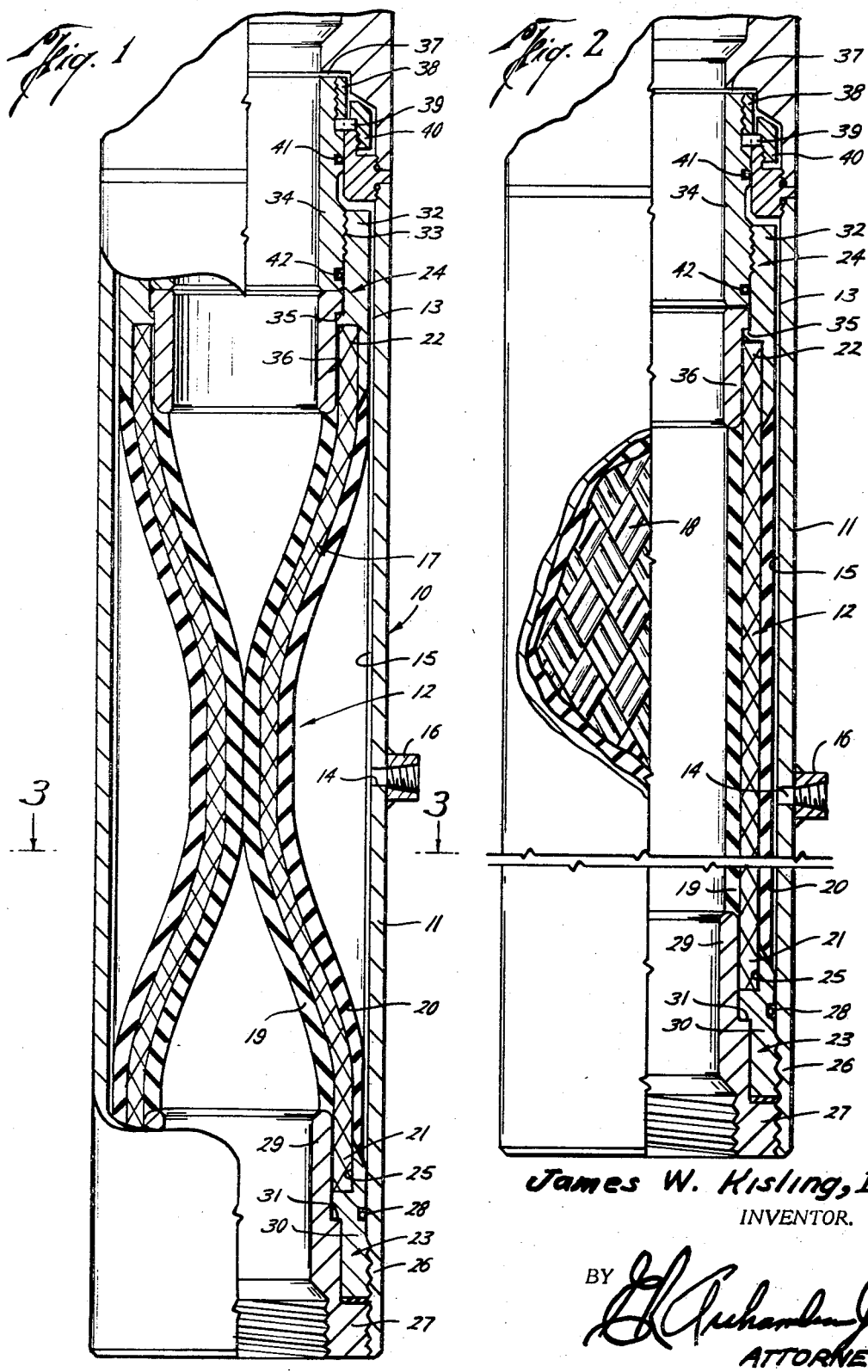

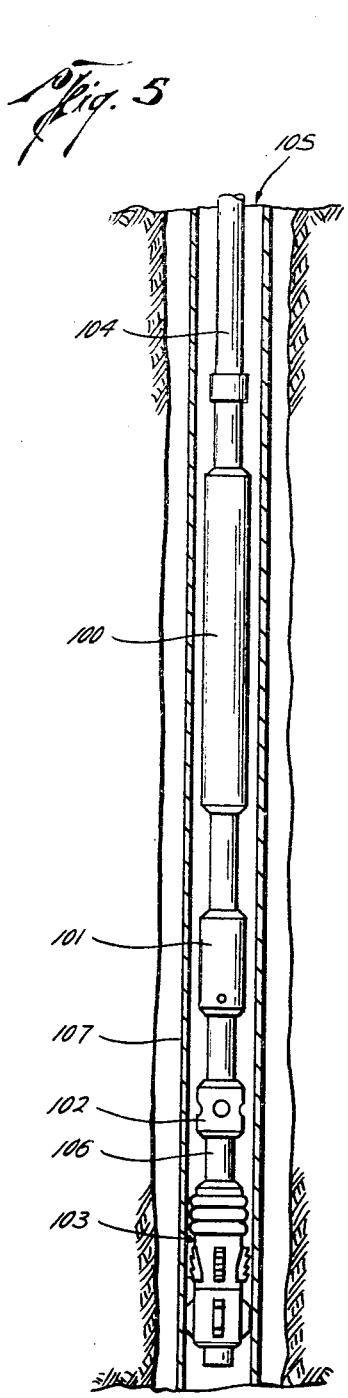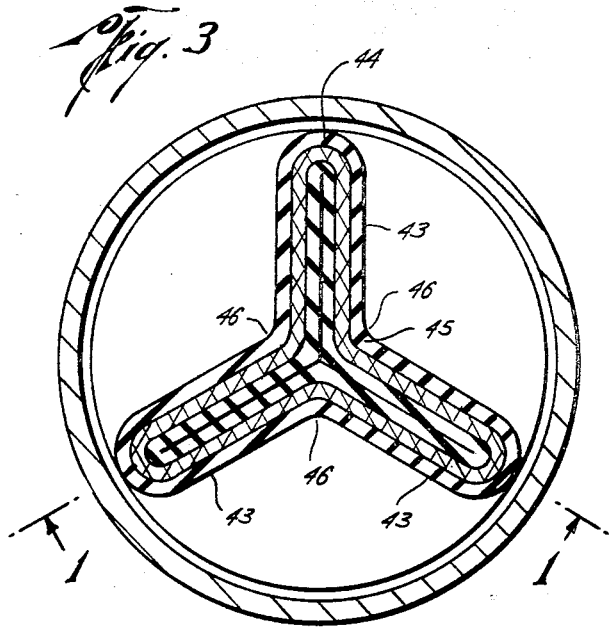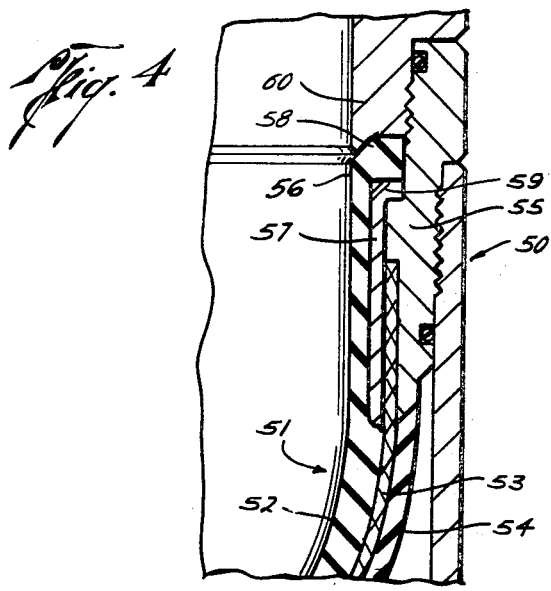

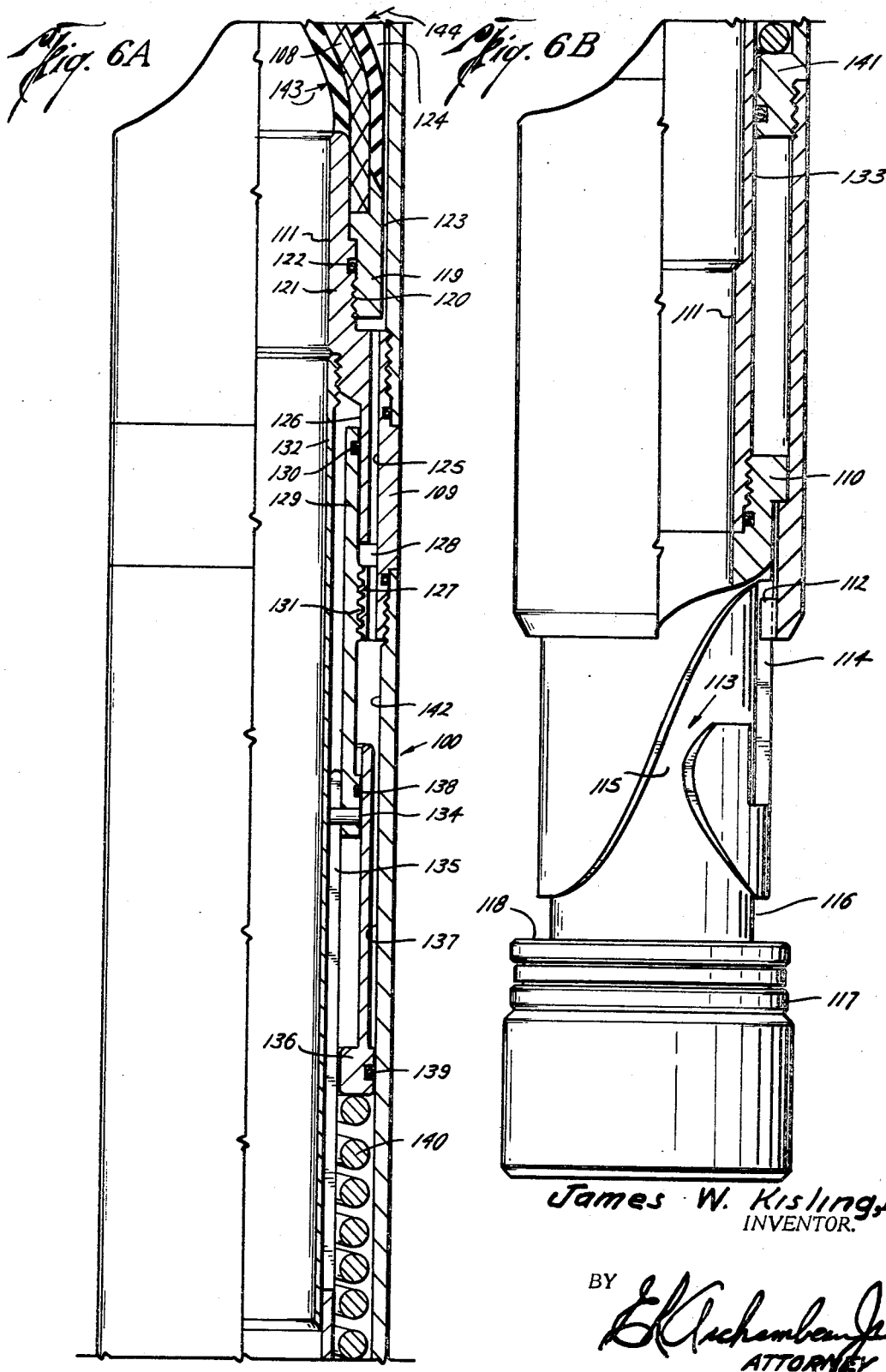

3,494,588
FLEXIBLE SLEEVE-ELEMENT VALVE
James W. Kisling III, Houston, Tex., assignor to Schlumberger Technology Corporation, New York, N.Y., a corporation of Texas
Original application Sept. 29, 1965, Ser. No. 491,345, now Patent No. 3,396,448, dated Aug. 13, 1968. Divided and this application Jan. 22, 1968, Ser. No. 699,704
Int. Cl. F16l 55/14; F16k 31/145
U.S. Cl. 251—5                              8 Claims

ABSTRACT OF THE DISCLOSURE

This invention relates to new and improved constrictible flexible sleeve members for sleeve-type valves. More particularly, as disclosed hereinafter, a sleeve element is formed with its reinforcing strands pre-positioned relative to one another as they will lie when the sleeve element is closed. In this manner, undue stresses will be avoided when the valve is closed against high pressure differentials.

This application is a division of application Ser. No. 491,345, filed Sept. 29, 1965.

Flexible conduit or collapsible sleeve valves have long been employed to control the flow of fluids having erosive and/or corrosive properties. Such valves are generally comprised of a resilient sleeve element concentrically disposed within a tubular housing, with the ends of the sleeve being fluidly sealed and firmly secured to the housing to provide a sealed annular space around the sleeve. By increasing the pressure within this outer annular space sufficiently in excess of that of the fluid flowing through the sleeve, the central portion of the sleeve is collapsed or constricted to control fluid communication through the sleeve.

It will be appreciated, however, that when a valve sleeve is constricted, the pressure differentials between the fluid downstream of the sleeve and those inside and around the sleeve will be acting on its full cross-sectional area. These pressure differentials can, therefore, exert substantial longitudinal forces on the sleeve, which forces must of course be carried, if at all, by the terminal portions of the sleeve that are secured to the housing. It will be further appreciated that the sleeve must also flex adjacent to these terminal portions each time it is actuated. Thus, repeated application of such longitudinal and flexure stresses on the terminal portions will ultimately cause a failure of the sleeve at or near these portions usually far in advance of any failure or deterioration in the collapsible central portion of the sleeve.

To overcome such failures, various measures have been proposed heretofore such as stiffening and greatly reinforcing the terminal portions of such sleeves. Although such measures have been generally satisfactory for relatively low-pressure applications, it has heretofore been considered impracticable to employ such valves in services where the pressure differentials could well be thousands of pounds per square inch.

Accordingly, it is an object of the present invention to provide new and improved reinforced sleeve elements that are capable of prolonged service even when operating under high differential pressures.

This and other objects of the present invention are provided by forming a constrictible, fluid-impervious flexible sleeve around a tubular mesh of reinforcing strands that has been first collapsed in its central portion to draw individual strands relative to one another and into a relaxed position before securing the ends of the strands relative to one another. As will subsequently be seen, this new and improved arrangement provides reinforced constrictible sleeves that, even when closed against high pressure differentials, will be effectively sealed as well as impose a minimum of tensile stresses on their terminal ends.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings, in which:

FIGURE 1 is an elevational view in partial cross-section of a valve of the present invention as it will appear when closed;

FIGURE 2 is a view similar to FIGURE 1, but showing the valve in its open position;

FIGURE 3 is a cross-sectional view taken along the lines 3—3 of FIGURE 1;

FIGURE 4 is a view showing an alternate manner of securing a sleeve element formed in accordance with the principles of the present invention to an outer housing;

FIGURE 5 shows a string of well tools including a tool employing the valve of the present invention as they may appear within a well bore; and FIGURES 6A–6B are successive elevational views, partially in cross-section of a portion of one of the tools depicted in FIGURE 5.

As seen in FIGURE 1, a valve 10 is comprised of a tubular body 11 having a resilient sleeve member 12 of the present invention coaxially mounted within the body bore 13. Coupling means, such as threads or flanges (not shown), are provided on each end of the body 11 for coupling the valve 10 into a flow line (not shown). An aperture 14 through the central portion of the body 11 permits introduction of hydraulic or pneumatic operating fluids into the enclosed space 15 between the sleeve 12 and body. Suitable connecting means, such as a threaded pipe member 16, are provided to join the space 15 within the body 11 through the aperture 14 to an external source of pressurized operating fluid (not shown).

The flexible sleeve 12 of the present invention is comprised of a tubular mesh 17 formed of tightly woven flexible reinforcing strands, such as wire cables 18 (FIGURE 2) or the like, that is susbstantially confined between inner and outer flexible tubes 19 and 20 of a fluid-impervious plastic or elastomeric material. To couple the sleeve 12 within the body 11 the ends 22 and 21 of the woven mesh 17 are extended beyond the flexible tubes 19 and 20 and connected to the body by suitable securing means such as tubular end fittings 23 and 24.

As seen in FIGURES 1 and 2, the exposed cable ends 21 at the lower end of the sleeve 12 are securely confined within a concentric annular socket 25 formed in the upper end of the lower end fitting 23. The lower end fitting 23 is, in turn, secured as by threads 26, to the upper end of an internal annular shoulder 27 in the lower end of the body 11 and fluidly sealed thereto by an O-ring 28.

To facilitate its manufacture and assembly, the lower end fitting 23 is preferably comprised of telescoped tubular members 29 and 30 that are interfitted together to define the cable end socket 25 and opposed, mating shoulders, as at 31, for holding the inner member 29 in position against body shoulder 27 when the outer member 30 is threadedly engaged therewith. A suitable potting compound, such as the epoxy composition described in U.S. Patent No. 3,003,798 or the like, is employed to secure the cable ends 21 within the socket 25 as well as to hold the interfitted end-fitting members 29 and 30 together.

The upper end fitting 24 is arranged substantially as the lower end fitting 23 but, however, is preferably not threaded to the body 11. Instead, to couple the upper end of the sleeve 12 to the body 11, the outer end-fitting member 32 is secured, as by threads 33, to an annular spacer member 34 which holds opposed shoulders, as at 35, of the end-fitting members 32 and 36 engaged. The upper end of the annular spacer member 34 is abutted against an internal body shoulder 37 and connected to a retainer ring 38. A key 39 on the annular spacer 34 is connected to the uper end of the body 11 by a second retaining ring 40 to prevent upward and downward movement as well as rotation of the end fitting 24 relative to the body. O-ring 41 and 42 around the annular spacer member 34 fluidly seal the upper end fitting 34 to the body 11.

Turning now to the particulars of the sleeve member 12 of the present invention, it will be realized that the usual practice is to constrict a resilient sleeve member by merely collapsing the opposite walls of its central portion together into a flattened, elongated oval cross-section. Inasmuch as each of these walls has a free length of one-half of the cricumference of the sleeve (½πD), the collapsed central portion of the sleeve cannot be accommodated across the diameter of a closely fitting housing. Instead, unless the housing is enlarged, the collapsed central portion of a conventional sleeve must assume a generally sinuous lateral path and perhaps even double back on itself. It will be recognized, of course, that pressure differentials across such an irregularly constricted sleeve will impose unequal stresses in the end portions of the sleeve.

As best illustrated in FIGURE 3 the valve sleeve member 12 of the present invention is fabricated in such a manner that, when collapsed, its central portion will assume a generally Y-shaped configuration of three equally spaced radial folds or bights 45. It will be recognized, of course, that when the sleeve 12 is fully opened, its circumference or perimeter will be equal to πD. On the other hand, when the central portion of the sleeve 12 is collapsed into the illustrated Y-shaped configuration, the perimeter around the three bights 43 will be substantially equal to six radii or three diameters. Thus, since the product 3D is substantially equal to πD, it will be appreciated that the sleeve 12 is capable of closing uniformly about its central axis without creating any unequal circumferential stresses when a pressure differential is acting thereon. It should also be realized that the body 11 need not be enlarged to accommodate the collapsed sleeve member 12.

Returning momentarily to FIGURES 1 and 2, it will be recognized that the longitudinal spacing between end fittings 23 and 24 will always remain constant. Thus, upon collapse of the central portion of the sleeve 12 into the three radially disposed folds 43 as shown in FIGURE 3, the length of a longitudinal path, such as at 44, through the sleeve wall at the outer end of any of the bights 43 will remain substantially constant. The length of a longitudinal path, such as at 45, through the sleeve wall midway between any two adjacent bights 43, however, will be substantially longer, as shown by FIGURE 1. Thus, it will be appreciated that if the sleeve 12 of the present invention were formed in the usual manner, that is to say in a cylindrical tube, constriction of the sleeve would require substantial elongation of those strands along the bight.

Accordingly, as a primary facet of the present invention, the tubular mesh is formed in its collapsed position, as for example as shown in FIGURES 1 and 3, to eliminate elongation of the strands extending between the bights 43. Thus, the tubular mesh 17 may be formed of flexible members or strands 18 that are much stronger than heretofore usable in conventional sleeves since the strands 18 need not be stretched to close the sleeve 12. Moreover, in contrast to a conventional sleeve, even when the sleeve member 12 is closed against an extreme differential pressure, little or no tensile stresses will be imposed on the tubular mesh 17 that would otherwise be induced as a result of elongation of the mesh between the bights 43. It will be realized, of course, that tensile stresses will be imposed on the reinforcing members of any sleeve by a pressure differential across it. However, in the sleeve 12 of the present invention, it is not necessary to impose further stresses on the strands 18 by having to elongate some of them in order to constrict the sleeve. These stresses will instead be uniformly distributed through the strands 18 about the perimeter of the sleeve and transmitted uniformly through the tubular mesh to the end fittings 23 and 24.

To fabricate the sleeve 12 of the present invention, the tubular mesh 17 is woven from a plurality of flexible strands or members, such as wires, cords, or cables 18. To facilitate the weaving of the cables 18, it is preferred to first weave the tubular mesh 17 into a cylindrical sleeve of about twice the desired final diameter. Although other types of strands, weave arrangements and patterns may be employed, in one preferred embodiment of the invention, each of the cables 18 were comprised of steel wires stranded together to form a cable of approximately 0.120-inch diameter. The tubular mesh 17 was then woven in groups of three paralleled cables 18 which intersected adjacent groups at an angle of approximately 60°.

Then, upon completion of the enlarged tubular mesh 17, its ends are pulled in opposite directions until the tubular mesh has reached its desired final diameter. Pulling of the tubular mesh 17 will, of course, bring the individual cables 18 closer to one another as well as reduce their angle of intersection to about one-half of their initial angle.

The open ends of the tubular mesh 17 are then slipped over and loosely clamped to either a suitable mandrel (not shown) or the inner end fitting members 29 and 36 to transfix the open ends. By means of a suitable jig (not shown), force is applied radially inwardly at three equally spaced points around the circumference of the tubular mesh 17 to displace its central portion into the above-mentioned Y-shaped cross-section. If desired, a Y-shaped jig (not shown) can also be temporarily inserted into the mesh 17 to facilitate the forming of the central portion.

As the mesh 17 is being constricted, it will be realized that certain ones of the cables 18 comprising the mesh will be drawn longitudinally relative to other cables and that certain other cables will be relatively undisturbed. When the tubular mesh 17 has been fully constricted, the longer ones of the cables 18 will define three circumferentially spaced indented surfaces 46 between shorter ones of the cables. Thus, it will be appreciated that although they are still relaxed, all of the cables 18 comprising the mesh 17 will be substantially in the position they will assume when pressure is applied around the completed fluid-impervious sleeve 12 to close it. Then, while the tubular mesh 17 is still held in its constricted position, the ends 21, 22 of the mesh are tightly clamped and, if desired, cut evenly. The end fittings 23 and 24 are then disposed around the cable ends 21, 22 and potted in place by the above-mentioned epoxy composition or other adhesives.

Once the end fittings 23 and 24 are in position, it will be appreciated that although the cables 18 are relaxed the tubular mesh 19 will remain generally in a constricted position. The inner and outer flexible tubes 19 and 20 are then disposed within the tubular mesh 17 and sealed to the end fittings 23 and 24 to insure a fluid-tight seal at each end of the tubes.

It should be understood, however, that the principles of the present invention are not limited to the above-described Y-shaped configuration. For example, the same procedure could be followed to form a sleeve that, when collapsed, its central portion will assume an X-shaped configuration of four equally spaced radial folds or bights. In view of the geometry of such a configuration, it will be appreciated that the outer ends of the radial folds or bights would not extend toward the housing as far as those illustrated in FIGURE 3. In other words, the radial dimension through each of these bights would be only about three-fourths of the corresponding dimension shown in FIGURE 3.

Similarly, a sleeve could be formed with its central portion flattened. This would require, of course, that the housing be of sufficient diameter to accommodate the flattened sleeve. In either event, by forming the reinforcing mesh with its cables fully relaxed and in the closed position, the objects of the present invention can be accomplished.

It will be realized that in many applications, corrosive and/or erosive liquids flowing through a flow line can require that a particular material be used for at least the inner sleeve 19. Although such special materials may be suited for the flowline fluid, it may well be that another material should or must be used for the outer sleeve 20. Thus, it is considered within the scope of the present invention to employ either the same or different materials for the two sleeves 19 and 20 where experience dictates that such materials be employed for the particular service. Moreover, specially arranged sleeves 19 and 20 can also be formed of plural laminations of various materials where flow-line conditions require such measures.

In many conditions of service, it is quite likely that the inner sleeve 19 could be expended more rapidly than the outer sleeve 20. Thus, as best seen in FIGURE 4, a valve 50 is arranged to mechanically secure the ends of the sleeve 51 in such a fashion that the inner tube 52 can be replaced without disturbing the tubular mesh 53 or outer tube 54. To accomplish this, an end fitting 55 otherwise similar to those shown in FIGURES 1 and 2 is so arranged that the associated end 56 of the inner tube 52 extends through the inner fitting member 57. An outwardly directed enlargement or bead 58 on the tube end 56 is secured between the outer end 59 of the fitting member 57 and a cooperative retaining ring 60. It will be appreciated that the retaining ring 60 could either serve as a terminal for the valve 50 as shown in FIGURE 4 or could be arranged generally as spacer member 34 in FIGURES 1 and 2. In any event, the inner tube 52 can be readily removed by removing the retaining ring 60 and its corresponding member (not shown) at the opposite end. Thus, replacement of the inner tube 52 is readily accomplished without requiring the disassembly of the valve 50 or removal of the tubular mesh 53 or outer tube 54.

Turning now to FIGURE 5, a number of full-bore well tools 100–103 are shown tandemly connected to one another and dependently coupled from the lower end of a tubing string 104 in a cased well bore 105 for performing such well completion operations as formation testing, squeeze cementing, acidizing or fluid-fracturing.

At the lower end of these tools, a conventional full-bore packer 103 is arranged for selectively packing-off the well bore 105 to remove the hydrostatic pressure of the well control fluids from the formations below where the packer is set. A conventional hydraulic holddown 102 is coupled to the mandrel 106 of the packer 103 and arranged to engage the casing 107 to secure the mandrel against upward movement whenever the packer is set and the pressure within the tubing string 104 exceeds the hydrostatic pressure of the well control fluids. A typical bypass valve 101 coupled in the string above the holddown 102 is suitably arranged to be opened to facilitate shifting of the tools 100–103 within the well bore 105 by diverting a substantial portion of the fluids through the central mandrel bore of the retracted packer 103. Connected at the upper end of the string of tools 100–103 is a tool 100 employing the principles of the present invention for selectively closing the tubing string 104 above the packer 103 to prevent entrance of fluids in the well bore 105 into the tubing string as the tools are being positioned.

By keeping the tubing string 104 "dry," it will be unnecessary to remove fluids from the tubing by swabbing or gas displacement before testing or completion operations can be started. Moreover, by selectively closing the lower end of the tubing string 104, treating fluids can be placed in the tubing above the tool 100 and selectively dicsharged below the packer 103 without having been contaminated by fluids in the well bore 105 as the tools 100–103 are being shifted from one position to another.

It will be recognized, of course, that valves in accordance with the present invention are ideally suited for such applications as these since the differentials between the hydraulic and upstream pressures and the downstream pressure can well be thousands of pounds per square inch in most well bores. Accordingly, in FIGURE 6A–6B, successive elevational views, partially in cross-section, are shown of the lower portion of the tool 100 in its closed position. Since it is obvious to those skilled in the art that such a tool 100 is typically comprised of separate tubular elements threadedly connected to one another to facilitate its manufacture and assembly, FIGURES 6A and 6B have been somewhat simplified by showing some of these separate elements as a single member for purposes of greater clarity. Moreover, inasmuch as the sleeve member 108 may be mounted within the housing 109 of the tool 100 in the same manner previously described and illustrated in FIGURES 1 and 2, it is believed unnecessary to redescribe these details.

As seen in FIGURES 6A–6B, the tool 100 is comprised of a movable tubular housing 109 having a resilient sleeve member 108 of the present invention mounted within its upper portion and its lower end telescopically fitted over the upper portion of a tubular mandrel 110. The upper end of the housing 109 and lower end of the mandrel 110 are provided with threads (not shown) for coupling the tool 100 into the tubing string 104 and other tools. The mandrel 110 and housing 109 are suitably arranged to provide a continuous axial bore 111 that is substantially the same diameter as that of the tubing string 104 when the sleeve 108 is open.

For establishing the longitudinal position of the housing 109 relative to the mandrel 110, an inwardly projecting lug 112 on the lower end of the housing is slidably received within a so-called "J-slot" 113 formed in the exterior wall of the mandrel. As best seen in FIGURE 6B, this J-slot 113 is comprised of a short vertical slot portion 114 having a closed lower end and an open upper end that is interconnected by a downwardly inclined transverse slot 115 to a circumferential slot 116 therebelow. A conventional thrust bearing 117 mounted around the mandrel 110 defines the bottom of this circumferential slot 116 and provides an upwardly directed surface 118 on which the lowermost end of the housing 109 will be engaged to carry the weight of the housing and tubing string 104 (FIGURE 5) whenever the housing is shifted downwardly and rotated relative to the mandrel.

As best seen in FIGURE 6A, the lower end fitting 119 of this sleeve member 108 is secured, as by threads 120, to the upper end of an internal annular shoulder 121 in the central portion of the housing and fluidly sealed thereto by an O-ring 122. The lower end fitting 119 is suitably sized to leave a sufficient annular clearance 123 around the end fitting for fluid communication from the enclosed space 124 between the housing 109 and sleeve member 108 to a longitudinal passage 125 through the housing shoulder 121. The lower portion of the central housing shoulder 121 is counterbored, as at 126, and internal screw threads 127 are formed in the lower end of the counterbore. A circumferential groove 128 above the screw threads 127 intersects passage 125 to provide fluid communication between the fluid passage and counterbore 126.

The upper end of a tubular member 129 is telescopically received in the counterbore 126 and normally fluidly sealed therein above the groove 128 by an O-ring 130. To hold the tubular jackscrew member 129 in the position illustrated in FIGURE 6A, complementary screw threads 131 around the central portion of the member are threadedly engaged with screw threads 127. An elongated tubular member 132 is dependently secured to the central housing shoulder 121 above the counterbore 126 and extended downwardly through the tubular jackscrew member 129. An elongated tubular member 133 is extended upwardly from the upper end of the mandrel 110 around the tubular housing extension 132, with the upper end of the mandrel extension 133 being telescopically received within the lower end of the jackscrew member 129.

The jackscrew member 129 is co-rotatively secured to the mandrel extension 133 by means of an inwardly projecting pin 134 that is received within a complementary longitudinal slot 135 in the tubular mandrel extension. An annular piston member 136 is slidably disposed in the annular space 137 between the housing 109 and mandrel extension 133, with the upper portion of the piston being concentrically fitted around the lower end of the jackscrew member 129 and fluidly sealed thereto by an O-ring 138. An O-ring 139 around the lower end of the piston member 136 fluidly seals the piston to the housing 109. A compression spring 140 between the lower end of the annular piston 136 and an internal housing shoulder 141 therebelow normally urges the piston upwardly relative to the housing 109.

It will be appreciated that the jackscrew member 129 and annular piston 136 together define a fluid-tight space or piston chamber 142 inside of the housing 109 below the housing shoulder 121 that is in fluid communication (by way of fluid passage 125 and annular clearance 123) with the sealed space 124 around the sleeve 108. Accordingly, by filling these spaces with suitable hydraulic fluid (through a conveniently located filling port) a fluid-tight hydraulic system will be provided so long as the jackscrew member 129 remains in the position shown in FIGURE 6.

It will be realized, therefore, that with the sleeve 108 in the closed position shown in FIGURE 6, the fluid pressure in the central bore 111 below the sleeve member will be acting upwardly on the bottom of the piston 136 as well as on the lower internal surface of the sleeve (as shown by arrow 143). Furthermore, it will be realized that the force of the spring 140 will also be acting through the annular piston 136. Thus, with the tool 100 in the closed position shown in FIGURE 6, the pressure in the hydraulic system (as at arrow 144) will be equal to the pressure in the central bore 111 of the tool below the sleeve 108 plus the product of the force developed by spring 140 divided by the annular cross-sectional area of the piston 136 between O-rings 138 and 139. This greater pressure inside of the enclosed space 124 around the sleeve 108 will, of course, keep the sleeve tightly closed and will be at a constant differential above the pressure in the central bore 111 since the spring 140 imposes a constant force on the piston 136. Thus, by selecting spring 140 to develop a constant differential above the hydrostatic pressure, the valve sleeve 108 will be held tightly closed without risking rupture of the housing 109.

Turning now to the operation of the tool 100, the tool is connected to a string of tools such as that shown in FIGURE 5, and is initially disposed in the position illustrated in FIGURE 6. As the tool 100 is being lowered into the well bore 105 (FIGURE 5), the hydrostatic pressure of the well control fluids therein will increase as the tool is lowered. The additional force of the spring 140 will be effective, however, to always develop a pressure in the hydraulic system at a constant differential above the hydrostatic pressure for maintaining the flexible sleeve 108 fully closed.

Once the tool 100 has reached the depth at which it is to be operated, the mandrel 110 is first secured relative to the casing 107. This may be done, for example, by first setting the packer 103 which secures the tool mandrel 110 relative to the casing 107 so that the tubing string 104 and tool housing 109 can be moved relative to the mandrel. Once the packer 103 has been set, by picking up and then torquing to the right, the lug 112 will slide downwardly through the inclined slot portion 115 until it reaches the circumferential slot 116. At this point, the lower end of the housing 109 will be engaged on the upper surface 118 of the thrust bearing 117 to support the weight of the housing and tubing string 104. As the housing 109 is shifted downwardly relative to the mandrel 110, the tubular jackscrew member 129 and annular piston 136 will be moved downwardly relative to the mandrel without changing their positions relative to one another or to the housing.

To open the sleeve member 108, it will be appreciated that the pressure in the enclosed space 124 around the sleeve must be reduced to that of the pressure in the central bore 111 below the sleeve. This is accomplished by means of releasing the hydraulic fluid within the system. Accordingly, when it is desired to open the axial passage 111 through the tool 100, the tubing string 104 is rotated a sufficient number of turns in the proper direction to disengage the O-ring 130 at the upper end of the jackscrew member 129 from sealing engagement with the internal surface of the counterbore 126.

It will be recognized that with the packer 103 holding the mandrel 110 fixed relative to the casing 107, the cooperative engagement of pin 134 within the longitudinal slot 135 will allow the jackscrew member 129 to shift downwardly but prevent its rotation. On the other hand, although shifting of the J-pin 112 into the circumferential slot portion 116 will allow the tubing string 104 to rotate the housing 109 relative to the stationary mandrel 110 and the jackscrew member 129, engagement of the lower housing end with the thrust bearing 117 will prevent further downward travel of the housing. Thus, as the housing 109 is rotated by the tubing string 104, the jackscrew member 129 will be shifted downwardly relative to the mandrel 110 and housing 109 as the screw threads 127 and 131 disengage.

Once the O-ring 130 at the upper end of the jackscrew member 129 passes into registry with the annular groove 128, the fluid in the hydraulic system will be released to allow the pressure in the central bore 111 to expand the sleeve 108 to its fully-open position. Once the fluid is released from the hydraulic system, the sleeve 108 will, of course, remain open.

Accordingly, it will be appreciated that by forming a constrictible fluid-impervious sleeve around a tubular mesh of reinforcing strands that has been initially collapsed in its closed position, reinforcing means will be provided that are capable of maintaining the sleeve tightly sealed even when closed against high pressure differentials. Moreover, by arranging the reinforcing strands in their relaxed and constricted positions in accordance with the present invention, it will not be necessary for these strands to elongate upon closing of the sleeve. Thus, by being able to employ much stronger reinforcing strands than has heretofore been possible, a sleeve-type valve may be constructed that is capable of withstanding generally longitudinal loads imposed by even extremely high pressure differentials. Furthermore, by employing the valve of the present invention, a full-opening well tool may be provided that is capable of maintaining a tight shutoff as well as being easily opened against high pressure differentials.

What is claimed is:

1. Apparatus comprising: a housing having a passage therein; a flexible fluid-impervious sleeve member in said passage; reinforcing means in said sleeve member including a plurality of circumferentially-spaced flexible strands of unequal length extending between longitudinally-spaced locations in said passage with longer ones of said strands defining at least one laterally-indented surface; means securing the end portions of said reinforcing strand srelative to said housing; and means fluidly sealing the end portions of said sleeve member relative to said housing for providing an enclosed space in said passage between said sleeve member and housing.

2. Apparatus comprising: a housing having a passage therein; a flexible fluid-imprevious sleeve member in said passage; reinforcing means in said sleeve member including a plurality of circlumferentially-spaced flexible strands of unequal length extending between longitudinally-spaced locations in said passage with longer ones of said strands defining a laterally-indented surface; means securing the end portions of said reinforcing strands relative to said housing; means fluidly sealing the end portions of said sleeve member relative to said housing for providing an enclosed space in said passage between said sleeve member and housing; and means for admitting fluid pressure into said enclosed space to permit collapse of said sleeve member and the intermediate portions of said longer reinforcing strands inwardly.

3. Apparatus comprising: a housing having a passage therein; a flexible fluid-impervious sleeve member in said passage; reinforcing means in said sleeve member including a plurality of circumferentially-spaced flexible strands of unequal length extending between longitudinally-spaced positions in said passage with longer ones of said strands defining laterally-indented surfaces between circumferentially-spaced shorter ones of said strands and adapted for cooperating to control flow through said sleeve member; means securing the end portions of said reinforcing strands relative to said housing; and means fluidly sealing the end portions of said sleeve member relative to said housing for providing an enclosed space in said passage between said sleeve member and housing.

4. The apparatus of claim 3 wherein said flexible strands are woven together into a tubular mesh so that said indented surfaces will be defined in said mesh between said circumferentially-spaced shorter strands.

5. Apparatus comprising: a housing having a passage therein; first and second flexible fluid-impervious co-axially-disposed sleeve members in said passage; reinforcing means between said sleeve members including a plurality of circumferentially-spaced flexible strands of unequal length extending between longitudinally-spaced locations in said passage with longer ones of said strands defining laterally-indented surfaces between circumferentially-spaced shorter ones of said strands and adapted for cooperating to control flow through said sleeve member; means securing the end portions of said reinforcing strands relative to said housing; and means fluidly sealing the end portions of said sleeve members relative to one another and said housing for providing an enclosed space in said passage between said sleeve members and housing.

6. The apparatus of claim 5 wherein said flexible strands are woven together into a tubular mesh so that three indented surfaces will be defined in said mesh between said circumferentially-spaced shorter strands.

7. As a subcombination, a flexible valve element comprising: a flexible fluid-impervious sleeve member; reinforcing means in said valve element including a plurality of circumferentially-spaced flexible strands of unequal length woven together into a tubular mesh and extending between the ends of said tubular mesh with longer ones of said strands defining laterally-indented surfaces in said tubular mesh between circumferentially-spaced shorter ones of said strands and adapted for cooperating to control flow through said sleeve member; and means securing the end portions of said strands to said flexible sleeve member.

8. The valve element of claim 7 further including: a second flexible fluid-impervious sleeve member coaxially disposed in said tubular mesh.

References Cited

UNITED STATES PATENTS

| | | | |
|---|---|---|---|
| 2,627,874 | 2/1953 | Johnson | 251—5 |
| 2,633,154 | 3/1953 | Eastman | 251—5 |
| 2,716,575 | 8/1955 | Vickers | 251—5 XR |
| 2,995,335 | 8/1961 | Raftis | 251—5 |

WILLIAM F. O'DEA, Primary Examiner
RICHARD GERARD, Assistant Examiner